Aug. 16, 1932.    J. W. JACKSON    1,872,146
BRAKE MECHANISM FOR BABY CARRIAGES
Filed Feb. 8, 1932    2 Sheets-Sheet 1
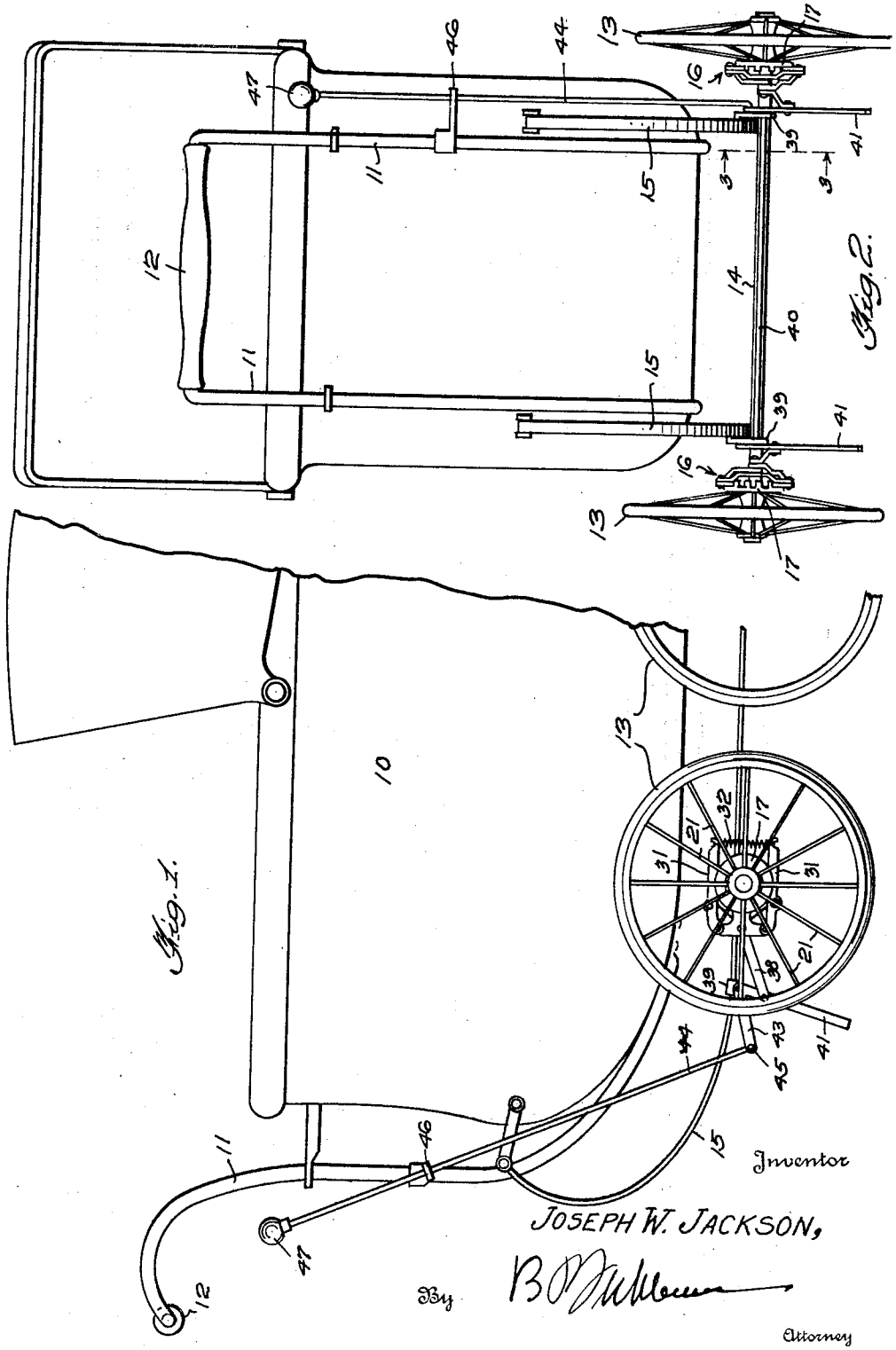

Aug. 16, 1932.  J. W. JACKSON  1,872,146
BRAKE MECHANISM FOR BABY CARRIAGES
Filed Feb. 8, 1932  2 Sheets-Sheet 2
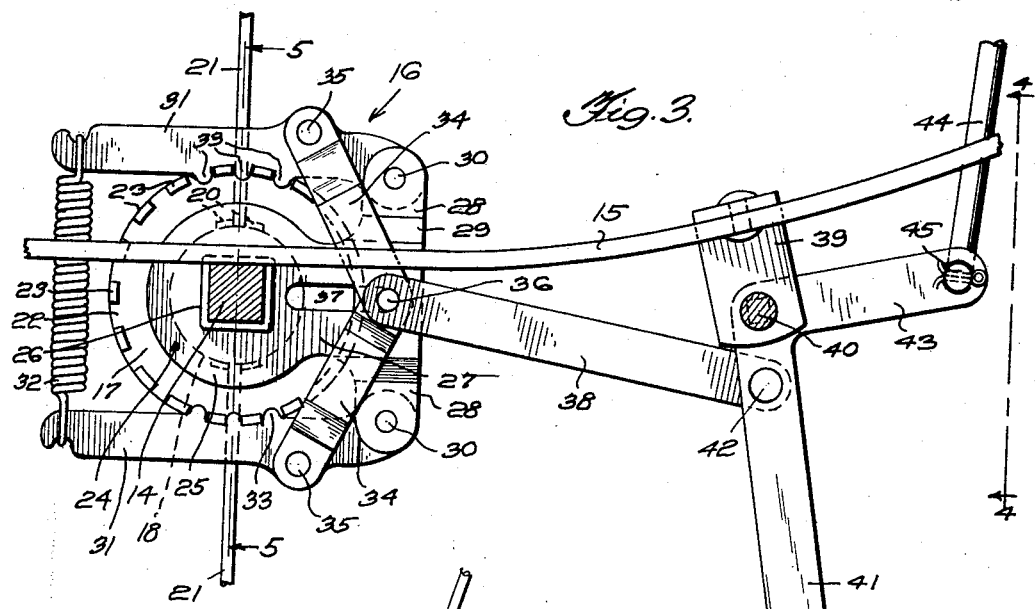
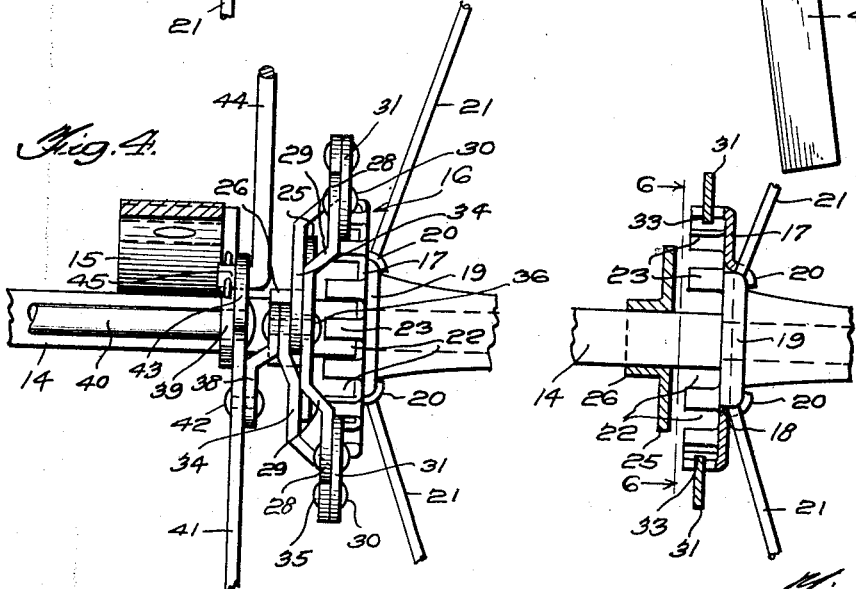
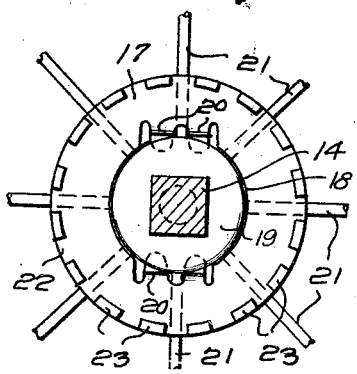
Inventor
JOSEPH W. JACKSON,
By
Attorney Patented Aug. 16, 1932

1,872,146

UNITED STATES PATENT OFFICE

JOSEPH W. JACKSON, OF WOODHAVEN, NEW YORK, ASSIGNOR TO SOLOMON SLATKIN, OF FORT LEE, NEW JERSEY

BRAKE MECHANISM FOR BABY CARRIAGES

Application filed February 8, 1932. Serial No. 591,728.

My invention relates to improvements in baby carriages, and has particular reference to a brake device for use in connection with the same.

An important object of the invention is to provide a brake device of the above-mentioned character, which is simple in construction, cheap to manufacture since it is constructed of parts formed mostly of stampings, has a minimum weight, maximum safety, is positive in operation without adjustment, and has the maximum efficiency.

A further object of the invention is to provide a brake device which may be applied to a baby carriage of the ordinary type, without materially altering the construction of the same.

Other objects and advantages will be apparent during the course of the following description.

In the accompanying drawings, wherein like numerals are used to designate like parts throughout the same, Figure 1 is a side elevation of a brake device embodying my invention, showing the same applied to a baby carriage, Figure 2 is an end elevation of the same, Figure 3 is an enlarged side elevation of the brake device, viewed from a section taken on line 3—3 of Figure 2, Figure 4 is an end elevation of the same, viewed from line 4—4 of Figure 3, Figure 5 is a transverse section taken on line 5—5 of Figure 3, and Figure 6 is a similar view taken on line 6—6 of Figure 5.

In the drawings, wherein for the purpose of illustration is shown a preferred embodiment of my invention, the numeral 10 designates the body portion of the baby carriage, provided with handle bars 11, carrying the usual handle 12. The chassis of the carriage includes front and rear wheels 13. The rear wheels 13 are mounted upon the spindles of a rear axle 14, which is square in cross-section. This rear axle has springs 15 secured thereto, and these springs support the body 10, as is customary.

I preferably employ two brake devices 16, for use in connection with the rear wheels 13 of the carriage. These brake devices are identical and a detailed description of one will suffice for both. Each brake device embodies a brake drum 17, having a central opening 18, for receiving the end 19 of the hub of the rear wheel. The drum 17 also has pairs of teeth 20, integral therewith, and these teeth are adapted to be bent downwardly over the flanged end 19 and extend upon opposite sides of the spokes 21. The drum 17 is, therefore, clamped to the hub of the wheel, and is rigidly attached thereto for rotation therewith. The drum 17 has its periphery provided with spaced openings or slots 22, affording spaced teeth 23. Disposed inwardly of and near each drum 17 is a supporting element 24, including an inner circular portion 25, having a tubular hub 26, square in cross-section to receive the rear axle 14. The tubular hub may be clamped or locked to the axle 14, if desired. The supporting element further comprises a horizontal arm 27, projecting rearwardly beyond the inner circular portion 25, and this arm is provided, at its rear end, with vertical upper and lower apertured knuckles 28, off-set outwardly with respect to the horizontal arm 27, by intermediate inclined portions 29.

Pivotally connected with the apertured knuckles 28, at 30, are upper and lower dogs 31, which extend above and below the brake drum 17 and forwardly beyond the same. These dogs are connected at their forward free ends by a retractile coil spring 32, as shown. These dogs 31 are provided upon their inner edges with inwardly projecting teeth 33, adapted to enter the openings or slots 22 between the teeth 23 of the brake drum and positively hold the brake drum against rotation. The dogs 31 are swung upon their pivots 30 in an outward direction so that the teeth 33 clear the teeth 23, by means of a toggle joint, including toggle links 34, pivoted at their outer ends to the dogs 31, as shown at 35. The pivots 35 are disposed outwardly of the pivots 30, as shown. The outer portions of these toggle links are off-set outwardly to extend over the brake drum 17, while their inner portions slidably engage the inner side of the horizontal arm 27, and their inner ends are pivotally connected by a bolt 36, slidable in a longitudinal slot 37, formed in the horizontal arm 27. The bolt 36 is also connected with a link 38.

Brackets 39 are rigidly attached to the springs 15, and these brackets pivotally support a transverse horizontal rock shaft 40, the outer ends of which are preferably square, and these square ends fit within square openings formed upon depending levers 41. The levers 41 are pivotally connected with the links 38, as shown at 42. A lever 43 may be rigidly attached to the square end of rock shaft 40, adjacent one lever 41, and lever 43 has pivotal connection with an upwardly extending reciprocatory rod 44, as shown at 45. This rod 44 is slidable within an apertured bracket 46, attached to one of the handle bars 11. The reciprocatory rod is provided at its free end with a handle or knob 47, arranged conveniently near the handle 12.

The operation of the device is as follows:—

With the rod 44 in the raised position, Figure 1, the spring 32 holds the dogs 31 in the inner or closed position, whereby they have positive locking engagement with the brake drum 17, since teeth 33 interlock with teeth 23. The toggle links 34 are now in the inclined or inner position. To release the brake drum 17 for rotation, the operator depresses the rod 44, and this causes the rock shaft 40 to turn, for swinging levers 41 forwardly. Links 38 are shifted forwardly, and these links swing the inner ends of toggle links 34 pivotally, expanding the toggle joint. The toggle links 34 move forwardly until bolts 36 engage the end walls of the slots 37. The toggle links are swung slightly forwardly past the center, so that they are held in the expanded position. The toggle joint shifts dog 34 outwardly so that the teeth 33 thereof disengage the teeth 23, thereby freeing the brake drums 17 for rotation. When it is again desired to lock the brake drums against rotation, the rod 44 is moved upwardly, which will shift bolts 36 rearwardly past center, and the springs 32 will then quickly swing the dogs 31 to the inner locking position. Levers 41 may be actuated by the foot, if desired.

It is to be understood that the form of my invention herewith shown and described is to be taken as the preferred example of the same, and that various changes in the shape, size and arrangement of parts may be resorted to without departing from the spirit of the invention, or the scope of the subjoined claims.

Having fully described my invention, what I claim is:

1. The combination with the axle of a baby carriage and wheel rotatable thereon including a hub, of a brake device comprising a brake drum having means for attachment with the hub and provided upon its periphery with spaced openings, a supporting element mounted upon the axle near the brake drum, dogs pivotally mounted upon the supporting element and disposed upon opposite sides of the brake drum and having teeth to enter the openings of the brake drum, yielding means to swing the dogs inwardly toward the brake drum, and manually operated means to swing the dogs outwardly from the brake drum.

2. The combination with the axle of a baby carriage and wheel rotatable thereon including a hub, of a brake device comprising a brake drum having means for attachment with the hub and provided upon its periphery with spaced openings, a supporting element mounted upon the axle near the brake drum, dogs pivotally mounted upon the supporting element and disposed upon opposite sides of the brake drum and having teeth to enter the openings of the brake drum, yielding means to swing the dogs inwardly toward the brake drum, toggle links pivotally connected with the dogs, and manually operated means to actuate the toggle links.

3. The combination with the axle of a baby carriage and wheel rotatable thereon including a hub, of a brake device comprising a brake drum having means for attachment with the hub, a supporting element mounted upon the axle and having a longitudinal slot, dogs pivotally mounted upon the supporting element and disposed upon opposite sides of the brake drum for engagement therewith, yielding means to move the dogs inwardly toward the brake drum, toggle links having their outer ends pivotally connected with the dogs, a pivot element connecting the inner ends of the links and operating within the slot, the arrangement being such that the pivot element moves past the center of the pivots at the outer ends of the toggle links when shifted to either end of the slot, and manually operated means to shift the toggle links.

4. A brake drum to be arranged upon the inner side of the wheel of a baby carriage and having means for attachment with the wheel so that the drum rotates with the wheel, a generally horizontal supporting element to be mounted upon the axle of a baby carriage and provided near its rear end with upwardly and downwardly extending knuckles, generally horizontal dogs arranged above and below the brake drum to engage therewith and pivotally connected at their rear ends with the knuckles, a retractile coil spring connecting the forward ends of the dogs to draw them inwardly, toggle links having their outer ends pivotally connected to the dogs at points forwardly of the supporting pivots of the dogs, a link, pivot means connecting the link with the inner ends of the toggle links, and a lever pivotally mounted upon a portion of the baby carriage and connected with the link to actuate the same.

5. Brake devices to be arranged inwardly of and near the wheels of a baby carriage, each device comprising a drum having means for attachment with the adjacent wheel, a generally horizontal supporting element mounted upon the axle of the baby carriage and provided near its rear end with apertured knuckles and having a longitudinal slot, generally horizontal dogs arranged above and below the brake drum to engage therewith and having their rear ends pivoted with the apertured knuckles, a retractile coil spring connecting the forward ends of the dogs, toggle links pivotally connected with the dogs, a pivot element connecting the inner ends of the links and operating within the longitudinal slot, a rock shaft mounted upon a portion of the baby carriage near its rear end, levers carried by the rock shaft and moved thereby, links pivotally connected with the levers and with the pivot elements connecting the inner ends of the toggle links, a lever connected with the rock shaft to turn it, and a rod connected with the last-named lever and extending upwardly toward the handle of the baby carriage.

In testimony whereof, I affix my signature.

JOSEPH W. JACKSON.